US011996764B2

(12) United States Patent
Aguilar et al.

(10) Patent No.: US 11,996,764 B2
(45) Date of Patent: May 28, 2024

(54) POWER CONVERTER WITH ASYMMETRIC SWITCH LEVELS

(71) Applicant: Texas Instruments Incorporated, Dallas, TX (US)

(72) Inventors: Alvaro Aguilar, Irving, TX (US); Yutian Cui, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 15 days.

(21) Appl. No.: 17/588,365

(22) Filed: Jan. 31, 2022

(65) Prior Publication Data
US 2023/0025078 A1    Jan. 26, 2023

Related U.S. Application Data

(60) Provisional application No. 63/224,738, filed on Jul. 22, 2021.

(51) Int. Cl.
*H02M 3/07* (2006.01)
*H02M 1/00* (2006.01)
*H02M 1/15* (2006.01)
*H02M 3/158* (2006.01)

(52) U.S. Cl.
CPC ........... *H02M 1/15* (2013.01); *H02M 1/0095* (2021.05); *H02M 3/07* (2013.01); *H02M 3/158* (2013.01)

(58) Field of Classification Search
CPC ....................... H02M 1/0095; H02M 3/07-078
See application file for complete search history.

(56) References Cited

U.S. PATENT DOCUMENTS

| | | | |
|---|---|---|---|
| 7,960,950 B2 | 6/2011 | Glovinsky | |
| 8,824,179 B2 | 9/2014 | Limpaecher | |
| 9,148,065 B2 | 9/2015 | Thomas et al. | |
| 9,520,792 B2 | 12/2016 | He et al. | |
| 9,948,177 B2 | 4/2018 | Alarcon-Cot et al. | |
| 10,903,738 B2 | 1/2021 | Zhang et al. | |
| 10,926,649 B2 | 2/2021 | Nagashima et al. | |
| 11,146,170 B2 | 10/2021 | Xiong et al. | |
| 2014/0070787 A1* | 3/2014 | Arno | H02M 3/02 323/304 |
| 2017/0331374 A1* | 11/2017 | Høyerby | H03F 3/183 |

OTHER PUBLICATIONS

Notification of Transmittal of the International Search Report and the Written Opinion of the Internationalsearching Authority, or the Declaration; PCT/US2022/035464; dated Dec. 15, 2022; 11 pages.

* cited by examiner

*Primary Examiner* — Peter M Novak
(74) *Attorney, Agent, or Firm* — Ray A. King; Frank D. Cimino

(57) ABSTRACT

Described embodiments include a circuit for limiting power converter output ripple. A first transistor has a first current terminal receiving an input voltage, and a second current terminal coupled to a first capacitor. A second transistor has a third current terminal coupled to the first capacitor, and a fourth current terminal is coupled to a second capacitor. A third transistor has a fifth current terminal coupled to the second capacitor, and a sixth terminal coupled to a filter input. A fourth transistor has a seventh current terminal coupled to the second current terminal, and an eighth current terminal coupled to the sixth current terminal. A fifth transistor has a ninth current terminal coupled to the fourth current terminal, and a tenth current terminal coupled to the sixth current terminal.

10 Claims, 3 Drawing Sheets

POWER CONVERTER WITH ASYMMETRIC SWITCH LEVELS

CROSS-REFERENCE TO RELATED APPLICATION

This application claims priority to U.S. Provisional Patent Application No. 63/224,738 filed Jul. 22, 2021, which is incorporated herein by reference.

BACKGROUND

This description relates to power converters, and particularly to buck voltage regulators. Increasingly, there is a requirement for efficient power converters having a high conversion ratio. The conversion ratio of a power converter is the ratio of the input voltage to the output voltage. Buck voltage regulators having power conversion ratios of three or greater are gaining in popularity.

Applications where a ratio of the input voltage to the output voltage of three or greater include wired and wireless mobile phone charging and computer servers. Power requirements for wired mobile phone charging are driven at least in part by Universal Serial Bus (USB) power standards. Requirements for wireless mobile phone chargers are driven in part by charging efficiency optimization. The charging efficiency of wireless mobile phone chargers can be improved by providing a high voltage input to the charging coil of the mobile phone, which is then brought down to a lower voltage to match the battery voltage. Servers are increasingly moving to a 48-volt distribution bus that may require a voltage conversion from 48V to 1.8V.

Achieving high conversion ratios by using existing circuit architectures can lead to low power efficiency due to the energy lost as a portion of the current from the higher voltage source is dissipated to ground. Existing architectures may require large inductors to remove the ripple on the output voltage. A larger inductor can lead to a larger inductor power loss due to its higher DC resistance, and thereby lower efficiency.

SUMMARY

In a first example, an integrated circuit for limiting power converter output ripple includes a first transistor having first and second current terminals. The first current terminal is coupled to an input voltage terminal and the second current terminal is adapted to be coupled to a first terminal of a first capacitor. A second transistor has third and fourth current terminals. The third current terminal is adapted to be coupled to a second terminal of the first capacitor, and the fourth current terminal is adapted to be coupled to the first terminal of a second capacitor.

A third transistor has fifth and sixth current terminals. The fifth current terminal is adapted to be coupled to a second terminal of the second capacitor, and the sixth terminal is adapted to be coupled to an input of a filter. A fourth transistor has seventh and eighth current terminals. The seventh current terminal is coupled to the second current terminal, and the eighth current terminal is adapted to be coupled to the input of the filter.

A fifth transistor has ninth and tenth current terminals. The ninth current terminal is coupled to the fourth current terminal. The tenth current terminal is adapted to be coupled to the input of the filter.

In a second example, a circuit for limiting power converter output ripple includes a first capacitor having first and second capacitor terminals, and a second capacitor having third and fourth capacitor terminals. A first transistor has first and second current terminals. The first current terminal is coupled to an input voltage terminal, and the second current terminal is coupled to the first capacitor terminal. A second transistor has third and fourth current terminals. The third current terminal is coupled to a second capacitor terminal, and the fourth current terminal is coupled to the third capacitor terminal.

A third transistor has fifth and sixth current terminals. The fifth current terminal is coupled to the fourth capacitor terminal, and the sixth terminal coupled to an input of a filter. A fourth transistor has seventh and eighth current terminals. The seventh current terminal is coupled to the second current terminal, and the eighth current terminal is coupled to the sixth current terminal. A fifth transistor has ninth and tenth current terminals. The ninth current terminal is coupled to the fourth current terminal, and the tenth current terminal is coupled to the sixth current terminal.

DETAILED DESCRIPTION

In this description, the same reference numbers depict the same or similar (by function and/or structure) features. The drawings are not necessarily drawn to scale.

Buck power converters have an input voltage that is higher than the regulated output voltage. The conversion ratio of a power converter is the ratio of the input voltage to the output voltage. Numerous applications today call for a buck power converter having a conversion ratio of three or greater. An example of an application requiring a high conversion ratio is a mobile phone battery charger.

Figure 1:
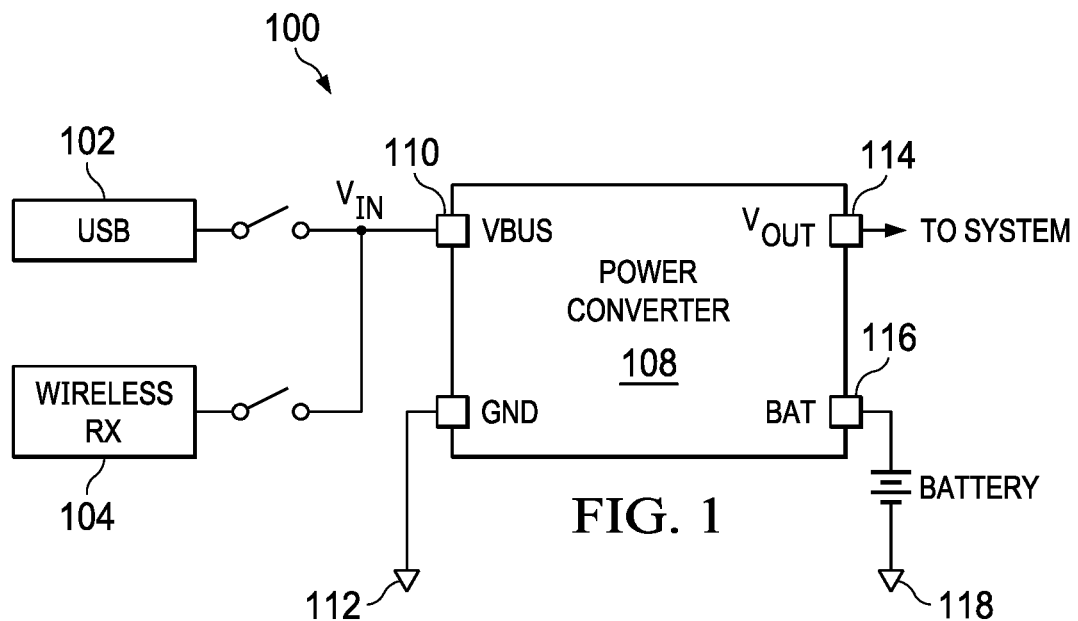
FIG. 1 shows a block diagram for an example mobile phone battery charger system including a power converter.

FIG. 1. shows a block diagram for an example mobile phone battery charger system 100 that includes a power converter. Mobile phone battery charging system 100 has two switchable sources for input power, USB connector 102 and wireless receiver 104. In at least one case, USB connector 102 is connected to a USB cable that delivers power derived from an AC power source through a power conversion adapter. Alternatively, wireless receiver 104 may deliver power from a charging mat or a similar wireless power source.

Power converter 108 includes the following terminals: VBUS 110, GND 112, $V_{OUT}$ 114, and BAT 116. Power is supplied from USB connector 102 or wireless receiver 104 to VBUS 110 at a voltage $V_{IN}$. A system ground reference can be connected to GND 112. A battery 118 can be connected to the BAT terminal 116. Power converter 108 has output $V_{OUT}$ 114 which can be coupled to power input terminals of other devices in the system, providing a regulated voltage source.

Figure 2:
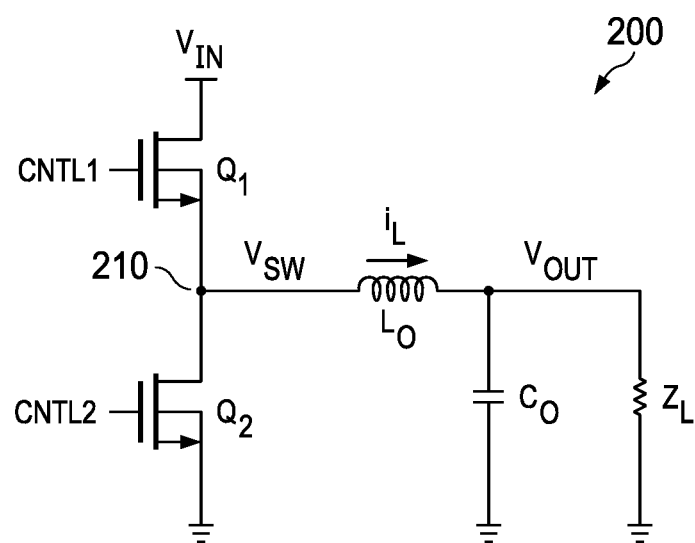
FIG. 2 shows a schematic diagram for a buck power converter having two switching voltage levels.

FIG. 2 shows a schematic diagram for a buck converter 200 having two switching voltage levels. Transistor $Q_1$ is coupled between an input voltage terminal at a voltage $V_{IN}$ and a switching node 210, which is at a voltage $V_{SW}$.

Transistor $Q_2$ is coupled between the switching node 210 and ground. An output terminal $V_{OUT}$ has a load impedance $Z_L$.

The control terminal of $Q_1$ is coupled to a controller that provides control signal CNTL1. The control terminal of $Q_2$ is coupled to the controller and receives control signal CNTL2. Signals CNTL1 and CNTL2 turn transistors $Q_1$ and $Q_2$ on and off, modulating the on times of $Q_1$ and $Q_2$ to maintain a desired regulated output voltage at $V_{OUT}$ while ensuring that $Q_1$ and $Q_2$ are never on at the same time.

An inductor $L_O$ is coupled between the switching node 210 and output terminal $V_{OUT}$. Capacitor $C_O$ is connected in parallel with load impedance $Z_L$ and is coupled to inductor $L_O$. Capacitor $C_O$ and inductor $L_O$ provide filtering for the output voltage $V_{OUT}$, filtering ripple present on the signal $V_{SW}$. The inductance value of inductor $L_O$ is chosen to be proportional to the magnitude of the ripple on the signal $V_{SW}$. A larger ripple voltage on $V_{SW}$ requires a larger inductor to absorb the ripple.

Turning on $Q_1$ while $Q_2$ is turned off makes $V_{SW}$ equal to $V_{IN}$ minus the drain-to-source voltage drop across $Q_1$. Turning off $Q_1$ and turning $Q_2$ on makes $V_{SW}$ equal to ground plus the drain-to-source voltage drop across $Q_2$. Hence, the voltage at switching node 210, $V_{SW}$, switches approximately between $V_{IN}$ and ground. Because the magnitude of the ripple voltage on $V_{OUT}$ is proportional to the magnitude of the voltage swing at $V_{SW}$, reducing this voltage swing reduces the magnitude of the ripple voltage present on $V_{SW}$.

Figure 3:
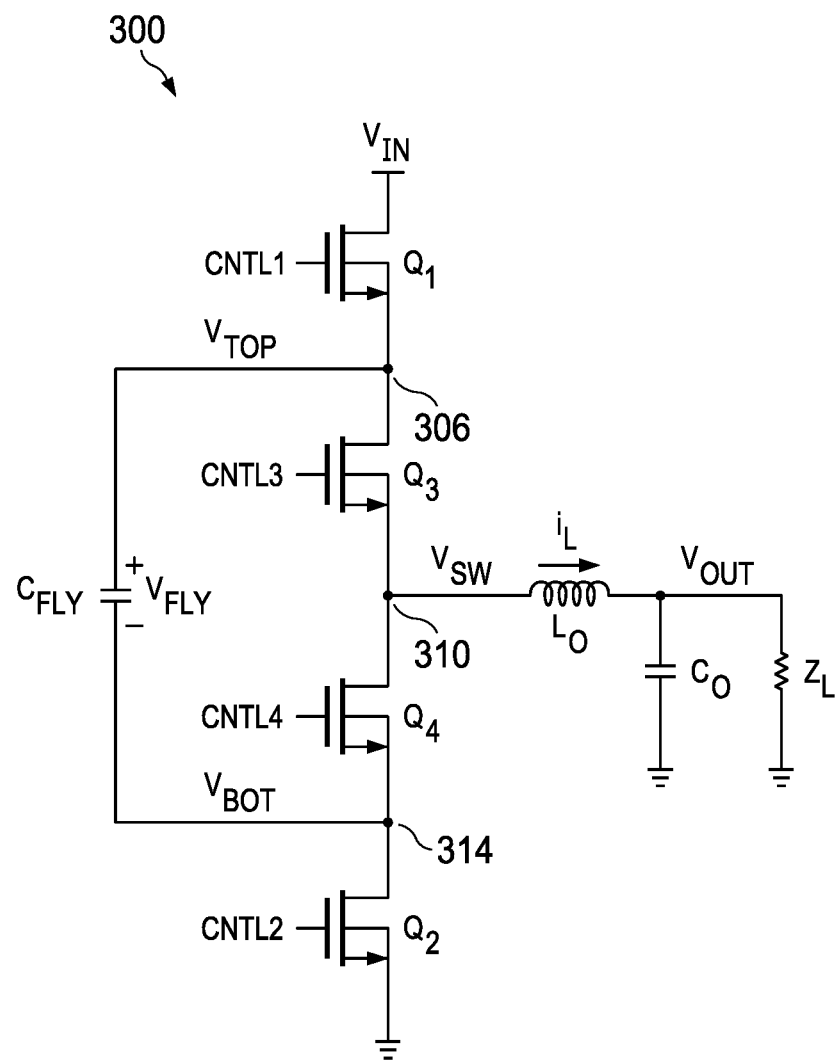
FIG. 3 shows a schematic diagram for a symmetric three-level buck power converter.

FIG. 3 shows a schematic diagram for a symmetric three-level buck converter 300. The symmetric three-level buck converter switches the voltage $V_{SW}$ at the switch node 310 between three voltage levels: $V_{in}$, $V_{in}/2$, and ground. The symmetric three-level buck converter 300 produces a ripple that is one-quarter the ripple produced by a two-level buck converter. This reduction in ripple is due to reducing the voltage swing at the switch node 310.

Transistor $Q_1$ is coupled between an input voltage terminal having a voltage $V_{IN}$ and transistor $Q_3$. Transistor $Q_1$ is coupled to transistor $Q_3$ at node 306, which is at a voltage $V_{TOP}$. Transistor $Q_2$ is coupled between ground and transistor $Q_4$. Transistor $Q_4$ is coupled to transistor $Q_3$ at switching node 310, which is at a voltage $V_{SW}$. Transistor $Q_2$ is coupled between the switching node 210 and ground. Transistor $Q_4$ is coupled to transistor $Q_2$ at node 314, which is at a voltage $V_{BOT}$. A capacitor $C_{FLY}$ is coupled between node 306 and node 314. The voltage across capacitor $C_{FLY}$ is equal to $V_{TOP}$ minus $V_{BOT}$. An output voltage terminal $V_{OUT}$ has a load impedance $Z_L$.

The control terminal of $Q_1$ is coupled to a controller that provides control signal CNTL1. The control terminal of $Q_2$ is coupled to the controller and receives control signal CNTL2. The control terminal of $Q_3$ is coupled to the controller and receives control signal CNTL3. The control terminal of $Q_4$ is coupled to the controller and receives control signal CNTL4. Signals CNTL1, CNTL2, CNTL3 and CNTL4 turn transistors $Q_1$, $Q_2$, $Q_3$, and $Q_4$, respectively, on and off, modulating the transistor on times to maintain a desired regulated output voltage at $V_{OUT}$ while ensuring that $V_{IN}$ and ground are never shorted.

An inductor $L_O$ is coupled between the switching node 310 and output terminal $V_{OUT}$. Capacitor $C_O$ is connected in parallel with load impedance $Z_L$, and is coupled between inductor $L_O$ and ground. Capacitor $C_O$ and inductor $L_O$ provide filtering to the output voltage $V_{OUT}$, filtering the ripple present on $V_{SW}$. The inductance value of inductor $L_O$ is chosen to be proportional to the magnitude of the ripple on the signal $V_{SW}$. A larger ripple voltage on $V_{SW}$ requires a larger inductor to absorb the ripple.

Turning on $Q_1$ and $Q_3$ with $Q_2$ and $Q_4$ turned off makes $V_{SW}$ approximately equal to $V_{IN}/2$ minus the drain-to-source voltage drops across $Q_1$ and $Q_3$. Capacitor $C_{FLY}$ holds the voltage at nodes 306 and 314 at three-quarters $V_{IN}$ and at one-quarter $V_{IN}$, respectively. Turning off $Q_1$ and $Q_3$ and turning on $Q_2$ and $Q_4$ makes $V_{SW}$ equal to ground plus the drain-to-source voltage drops across $Q_2$ and $Q_4$. Hence, the voltage at switching node 310, $V_{SW}$, switches approximately between $V_{IN}/2$ and ground. Reducing the voltage swing at $V_{SW}$ by half reduces the magnitude of the ripple voltage on $V_{OUT}$ to one-quarter of the ripple magnitude from the two-level buck converter. Further reduction in the ripple voltage on $V_{OUT}$ can be achieved in cases where the input voltage is three or more times greater than the output voltage.

Figure 4:
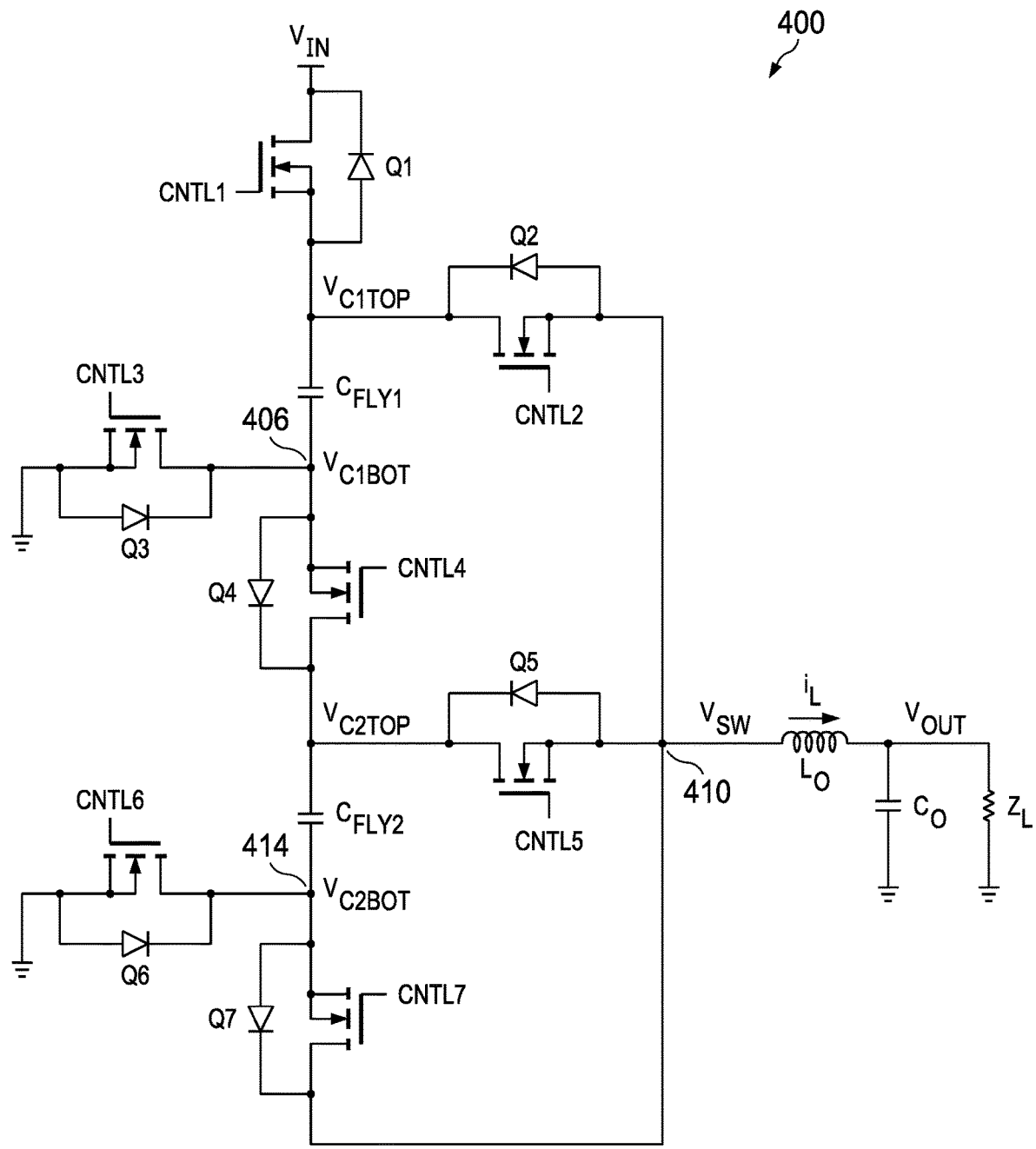
FIG. 4 shows a schematic diagram for an asymmetric three-level buck power converter.

FIG. 4 shows a schematic diagram for an asymmetric three-level buck converter 400. The asymmetric three-level buck converter switches the voltage $V_{SW}$ at the switch node 410 between three voltage levels: $V_{in}$, $V_{in}/3$, and ground. The asymmetric three-level buck converter 400 produces a ripple voltage on $V_{SW}$ that is lower than the ripple voltage produced by a two-level buck converter or a symmetric three-level buck converter. This reduction in the ripple is due to reducing the voltage swing at the switch node 410 to a lower voltage than the switch node voltage swing with either the two-level buck converter or the symmetric three-level buck converter. A lower voltage swing at the switch node produces lower ripple on the switching voltage signal $V_{SW}$.

Transistor $Q_1$ is coupled between an input voltage terminal having a voltage $V_{IN}$ and a first terminal of a capacitor $C_{FLY1}$. Transistor $Q_3$ is coupled between a second terminal of capacitor $C_{FLY1}$ and ground. Transistor $Q_4$ is coupled between the second terminal of capacitor $C_{FLY1}$ and a first terminal of capacitor $C_{FLY2}$. Transistor $Q_6$ is coupled between a second terminal of capacitor $C_{FLY2}$ and ground. Q7 is coupled between the second terminal of capacitor $C_{FLY2}$ and switching node 410, which is at a voltage $V_{SW}$. Transistor $Q_5$ is coupled between the first terminal of capacitor $C_{FLY2}$ and switching node 410. Transistor $Q_2$ is coupled between the first terminal of capacitor $C_{FLY1}$ and switching node 410. An output terminal $V_{OUT}$ has a load impedance $Z_L$. Capacitors $C_{FLY1}$ and $C_{FLY2}$ can be external to the device, or may be integrated into the same package as transistors $Q_1$, $Q_2$, $Q_3$, $Q_4$, $Q_5$, $Q_6$, and $Q_7$.

The control terminal of $Q_1$ is coupled to a controller providing control signal CNTL1. The control terminal of $Q_2$ is coupled to the controller and receives control signal CNTL2. The control terminal of $Q_3$ is coupled to the controller and receives control signal CNTL3. The control terminal of $Q_4$ is coupled to the controller and receives control signal CNTL4. The control terminal of $Q_5$ is coupled to a controller providing control signal CNTL5. The control terminal of $Q_6$ is coupled to the controller and receives control signal CNTL6. The control terminal of $Q_7$ is coupled to the controller and receives control signal CNTL7. Signals CNTL1, CNTL2, CNTL3, CNTL4, CNTL5, CNTL6 and CNTL7 turn transistors $Q_1$, $Q_2$, $Q_3$, $Q_4$, $Q_5$, $Q_6$, and $Q_7$, respectively, on and off, modulating the on times of transistors $Q_1$, $Q_2$, $Q_3$, $Q_4$, $Q_5$, $Q_6$, and $Q_7$ to maintain a desired regulated output voltage at $V_{OUT}$ while ensuring that $V_{IN}$ and ground are never shorted. Transistors $Q_1$, $Q_2$, $Q_3$, $Q_4$, $Q_5$, $Q_6$, and $Q_7$ can be field effect transistors (FETs) or can be bipolar junction transistors (BJTs).

An inductor $L_O$ is coupled between the switching node 410 and output terminal $V_{OUT}$. Capacitor $C_O$ is connected in parallel with load impedance $Z_L$, and is coupled between inductor $L_O$ and ground. Capacitor $C_O$ and inductor $L_O$ provide filtering to the output voltage $V_{OUT}$, filtering ripple present on $V_{SW}$. The inductance value of inductor $L_O$ is chosen to be proportional to the magnitude of the ripple on the signal $V_{SW}$. A larger ripple voltage on $V_{SW}$ requires a larger inductor to absorb the ripple.

Asymmetric three-level buck converter 400 operates in a continuously recurring cycle having four segments. Asymmetric three-level buck converter 400 operates to maintain charge balance on capacitors $C_{FLY1}$ and $C_{FLY2}$, and produce the desired regulated output voltage at $V_{OUT}$. The voltage $V_{SW}$ at switch node 410 switches between $V_{IN}/3$ and ground.

In the case where the voltage at $V_{IN}$ is more than three times the voltage at $V_{OUT}$, transistors $Q_1$, $Q_4$ and $Q_7$ are turned on while transistors $Q_2$, $Q_3$, $Q_5$ and $Q_6$ are off during the first segment of the cycle. $V_{IN}$ is connected to $V_{OUT}$ through capacitors $C_{FLY1}$ and $C_{FLY2}$ during the first segment of the cycle. The voltage drop across each of capacitors $C_{FLY1}$ and $C_{FLY2}$ is $V_{IN}/3$. Therefore, the voltage $V_{SW}$ at the switching node 410 is $V_{IN}/3$. The voltage at $V_{C2TOP}$ is 2/3 $V_{IN}$ and the voltage $V_{C1TOP}$ is at $V_{IN}$. The voltage $V_{SW}$ is greater than $V_{OUT}$, so the inductor current $I_L$ is charging up during the first segment of the cycle. Capacitors $C_{FLY1}$ and $C_{FLY2}$ are also being charged during the first segment of the cycle.

During the second segment of the cycle, in the case where the voltage at $V_{IN}$ is more than three times the voltage at $V_{OUT}$, transistors $Q_6$ and $Q_7$ are turned on while transistors $Q_1$, $Q_2$, $Q_3$, $Q_4$ and $Q_5$ are turned off. The voltage $V_{SW}$ at switch node 410 is held at approximately ground through transistors $Q_7$ and $Q_6$. During the second segment, the inductor current $I_L$ is discharging through the load $Z_L$ and the charges on capacitors $C_{FLY1}$ and $C_{FLY2}$ remain as they were at the end of the first segment.

During the third segment of the cycle, in the case where the voltage at $V_{IN}$ is more than three times the voltage at $V_{OUT}$, transistors $Q_2$, $Q_3$, $Q_5$ and $Q_6$ are turned on while transistors $Q_1$, $Q_4$ and $Q_7$ are turned off. The voltage $V_{SW}$ at the switching node 410 is at $V_{IN}/3$. During the third segment, capacitors $C_{FLY1}$ and $C_{FLY2}$ are discharged to keep the capacitor charge balanced, allowing the voltage $V_{SW}$ at the switching node 410 to remain at $V_{IN}/3$. During the third segment, capacitors $C_{FLY1}$ and $C_{FLY2}$ are connected in parallel through transistor combinations $Q_2$-$Q_3$ and $Q_5$-$Q_6$. Capacitors $C_{FLY1}$ and $C_{FLY2}$ act as a power supply supplying current to the circuit during the third segment. The inductor current $I_L$ charges up and capacitors $C_{FLY1}$ and $C_{FLY2}$ slowly discharge during the third segment of the cycle.

The fourth segment of the cycle is similar to the second segment of the cycle. During the fourth segment of the cycle, in the case where the voltage at $V_{IN}$ is more than three times the voltage at $V_{OUT}$, transistors $Q_6$ and $Q_7$ are turned on while transistors $Q_1$, $Q_2$, $Q_3$, $Q_4$ and $Q_5$ are turned off. The voltage $V_{SW}$ at switch node 410 is brought back to approximately ground through transistors $Q_7$ and $Q_6$. During the fourth segment, the inductor current $I_L$ discharges through the load impedance $Z_L$ and the charges on capacitors $C_{FLY1}$ and $C_{FLY2}$ remains as they were at the end of the third segment. Following the fourth segment of the cycle, the cycle goes back to the first segment and the cycle continues repeating.

In the case where the voltage at $V_{IN}$ is less than three times the voltage at $V_{OUT}$, the circuit operation of the first and third segments of the cycle are the same as the case where the voltage at $V_{IN}$ is more than three times the voltage at $V_{OUT}$, but the second and fourth segments of the cycle operates differently. When the voltage at $V_{IN}$ is less than three time the voltage at $V_{OUT}$, transistors $Q_1$, $Q_4$ and $Q_7$ are turned on while transistors $Q_2$, $Q_3$, $Q_5$ and $Q_6$ are turned off. $V_{IN}$ is connected to $V_{OUT}$ through capacitors $C_{FLY1}$ and $C_{FLY2}$ and the voltage drop across each of $C_{FLY1}$ and $C_{FLY2}$ is $V_{IN}/3$. Therefore, the voltage $V_{SW}$ at the switching node 410 is $V_{IN}/3$. The voltage at $V_{C2TOP}$ is at 2/3 $V_{IN}$ and $V_{C1TOp}$ is at $V_{IN}$. The voltage $V_{SW}$ is lower than $V_{OUT}$, so the inductor current $I_L$ is negative as inductor $L_O$ charges up during the first segment of the cycle. Capacitors $C_{FLY1}$ and $C_{FLY2}$ are also being charged during this segment of the cycle.

During the second segment of the cycle, in the case where the voltage at $V_{IN}$ is less than three times the voltage at $V_{OUT}$, transistors $Q_1$ and $Q_2$ are turned on while transistors $Q_3$, $Q_4$, $Q_5$, $Q_6$ and $Q_7$ are turned off. The voltage $V_{SW}$ at switch node 410 is held at approximately $V_{IN}$ through transistors $Q_1$ and $Q_2$. During the second segment, the inductor current $I_L$ is charging, and the charges on capacitors $C_{FLY1}$ and $C_{FLY2}$ remain as they were at the end of the first segment.

During the third segment of the cycle, in the case where the voltage at $V_{IN}$ is more than three times the voltage at $V_{OUT}$, transistors $Q_2$, $Q_3$, $Q_5$ and $Q_6$ are turned on while transistors $Q_1$, $Q_4$ and $Q_7$ are turned off. The voltage $V_{SW}$ at the switching node 410 is at $V_{IN}/3$. During the third segment, capacitors $C_{FLY1}$ and $C_{FLY2}$ are discharged to keep the capacitor charges balanced, allowing the voltage $V_{SW}$ at the switching node 410 to remain at $V_{IN}/3$. Capacitors $C_{FLY1}$ and $C_{FLY2}$ are connected in parallel through transistors $Q_2$-$Q_3$ and $Q_5$-$Q_6$. Capacitors $C_{FLY1}$ and $C_{FLY2}$ act as a power supply to the circuit during the third segment. The inductor $L_O$ discharges because $V_{OUT}$ is at a higher voltage than the switch node voltage $V_{SW}$. The inductor current decreases and capacitors $C_{FLY1}$ and $C_{FLY2}$ discharge during the third segment. The charge that was stored in capacitors $C_{FLY1}$ and $C_{FLY2}$ during segment 1 is discharged in segment 3 of the cycle.

The fourth segment of the cycle is similar to the second segment. During the fourth segment of the cycle, in the case where the voltage at $V_{IN}$ is less than three times the voltage at $V_{OUT}$, transistors $Q_1$ and $Q_2$ are turned on while transistors $Q_3$, $Q_4$, $Q_5$, $Q_6$ and $Q_7$ are turned off. The voltage $V_{SW}$ at switch node 410 is held at approximately $V_{IN}$ through transistors $Q_1$ and $Q_2$. During the fourth segment, the inductor current $I_L$ is charged, and the charges on capacitors $C_{FLY1}$ and $C_{FLY2}$ remain as they were at the end of the third segment. Following the fourth segment of the cycle, the cycle goes back to the first segment and the cycle continues repeating.

Asymmetric three-level buck converter 400 is optimized for use in high input voltage, low output voltage applications. However, the design is still useful for other power converter applications, albeit possibly with reduced benefits.

Additional ripple reduction may be obtained by adding additional switching voltage levels, but with compromised performance in other parameters. For example, the asymmetric three-level buck converter provides approximately the same ripple reduction as a four-level buck converter. However, the asymmetric three-level buck converter 400 has only two transistors in series between $V_{IN}$ and $V_{OUT}$, while the four-level buck converter has three transistors in series which current must pass through between $V_{IN}$ and $V_{OUT}$. Therefore, the asymmetric three-level buck converter has less DC resistance than the four-level buck converter due to having fewer drain-to-source resistances in series with the filter inductance. The higher series resistance of the four-level converter means the four-level converter has a higher power loss, and thus a lower power efficiency, than the asymmetric three-level buck converter.

A benefit of the asymmetric three-level converter over a two-level converter, or even a symmetric three-level converter, is that a smaller inductor is needed to achieve the same ripple reduction because the voltage swing levels at the switching node are smaller with the asymmetric three-level converter. Therefore, the ripple that is generated by the switching is smaller with the asymmetric three-level converter. The filter inductor $L_O$ is sized proportional to the ripple, so a smaller inductor is needed with the asymmetric three-level converter. If the inductance is reduced, the DC resistance of the inductor is reduced, thereby decreasing the power loss in the inductor.

As used herein, "terminal", "node", "interconnection", "lead" and "pin" are used interchangeably. Unless specifically stated to the contrary, these terms generally mean an interconnection between or a terminus of a device element, a circuit element, an integrated circuit, a device, or other electronics or semiconductor component.

In this description, "ground" includes a chassis ground, an Earth ground, a floating ground, a virtual ground, a digital ground, a common ground, and/or any other form of ground connection applicable to, or suitable for, the teachings of this description.

In this description, even if operations are described in a particular order, some operations may be optional, and the operations are not necessarily required to be performed in that particular order to achieve desirable results. In some examples, multitasking and parallel processing may be advantageous. Moreover, a separation of various system components in the embodiments described above does not necessarily require such separation in all embodiments.

Modifications are possible in the described embodiments, and other embodiments are possible, within the scope of the claims.

What is claimed is:

1. An integrated circuit for limiting power converter output ripple, the integrated circuit comprising:
   a first transistor having first and second current terminals, the first current terminal coupled to an input voltage terminal;
   a first capacitor having first and second capacitor terminals, the first capacitor terminal coupled to the second current terminal;
   a second transistor having third and fourth current terminals, the third current terminal coupled to the second capacitor terminal;
   a second capacitor having third and fourth capacitor terminals, the third capacitor terminal coupled to the fourth current terminal;
   a third transistor having fifth and sixth current terminals, the fifth current terminal coupled to the fourth capacitor terminal;
   a fourth transistor having seventh and eighth current terminals, the seventh current terminal coupled to the second current terminal, and the eighth current terminal coupled to the sixth current terminal; and
   a fifth transistor having ninth and tenth current terminals, the ninth current terminal coupled to the fourth current terminal, and the tenth current terminal coupled to the sixth current terminal and the eighth current.

2. The integrated circuit of claim 1, further comprising:
   a sixth transistor having eleventh and twelfth current terminals, the eleventh current terminal coupled to the third current terminal, and the twelfth current terminal coupled to a ground terminal; and
   a seventh transistor having thirteenth and fourteenth current terminals, the thirteenth current terminal coupled to the fifth current terminal, and the fourteenth current terminal coupled to the ground terminal.

3. The integrated circuit of claim 2, wherein an output voltage terminal is adapted to be coupled to a first terminal of an inductor, and the tenth current terminal is adapted to be coupled to a second terminal of the inductor.

4. The integrated circuit of claim 3, wherein the integrated circuit is configured to operate on a recurring operational cycle, the recurring operational cycle including a first operating phase, a second operating phase, a third operating phase, and a fourth operating phase.

5. The integrated circuit of claim 2, in which the first, second, third, fourth, fifth, sixth and seventh transistors are FETs.

6. A circuit for limiting power converter output ripple, comprising:
   a first capacitor having first and second capacitor terminals;
   a second capacitor having third and fourth capacitor terminals;
   a first transistor having first and second current terminals, the first current terminal coupled to an input voltage terminal, the second current terminal coupled to the first capacitor terminal;
   a second transistor having third and fourth current terminals, the third current terminal coupled to a second capacitor terminal, and the fourth current terminal coupled to the third capacitor terminal;
   a third transistor having fifth and sixth current terminals, the fifth current terminal coupled to the fourth capacitor terminal;
   a fourth transistor having seventh and eighth current terminals, the seventh current terminal coupled to the second current terminal, and the eighth current terminal coupled to the sixth current terminal; and
   a fifth transistor having ninth and tenth current terminals, the ninth current terminal coupled to the fourth current terminal, and the tenth current terminal coupled to the sixth current terminal and the eighth current terminal.

7. The integrated circuit of claim 5, wherein the first, second and third transistors are configured to be turned on, and the fourth, fifth, sixth and seventh transistors are configured to be turned off responsive to if a voltage at the input voltage terminal being is at least three times a voltage at the output voltage terminal.

8. The circuit of claim 7, further comprising a filter having:
   an inductor having first and second inductor terminals, the first inductor terminal coupled to the eighth current terminal, and the second inductor terminal coupled to an output voltage terminal; and
   a third capacitor coupled between the output voltage terminal and the ground terminal.

9. The circuit of claim 8, wherein the first, second and third transistors are configured to be turned on, and the fourth, fifth, sixth and seventh transistors are configured to be turned responsive to a voltage at the input voltage terminal being at least three times a voltage at the output voltage terminal.

10. The circuit of claim 7, in which the first, second, third, fourth, fifth, sixth and seventh transistors are FETs.

* * * * *